United States Patent
Hernandez

(10) Patent No.: US 8,112,398 B1
(45) Date of Patent: Feb. 7, 2012

(54) METHODS, SYSTEMS, AND COMPUTER PROGRAM PRODUCTS FOR SELECTIVELY MARKING AND RETRIEVING DATA FROM AN EVENT LOG FILE

(75) Inventor: Raul Davalos Hernandez, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 548 days.

(21) Appl. No.: 11/823,642

(22) Filed: Jun. 28, 2007

(51) Int. Cl.
*G06F 17/30* (2006.01)

(52) U.S. Cl. .......................... 707/661; 707/672; 707/812

(58) Field of Classification Search .................... 707/672
See application file for complete search history.

(56) References Cited

U.S. PATENT DOCUMENTS

| | | | |
|---|---|---|---|
| 2004/0044912 A1* | 3/2004 | Connary et al. | 713/201 |
| 2005/0022213 A1* | 1/2005 | Yamagami | 719/328 |
| 2007/0185938 A1* | 8/2007 | Prahlad et al. | 707/204 |
| 2008/0034424 A1* | 2/2008 | Overcash et al. | 726/22 |

OTHER PUBLICATIONS

"EMC Navisphere Analyzer," Data Sheet, pp. 1-4 (Copyright 2002).

* cited by examiner

*Primary Examiner* — Baoquoc To
(74) *Attorney, Agent, or Firm* — Jenkins, Wilson, Taylor & Hunt, P.A.

(57) ABSTRACT

Methods, systems, and computer program products for selectively marking and retrieving data from an event log file are described. One method includes providing a first syntax for user insertion of at least one bookmark into an event log file associated with a computing system, wherein the event log file records event data that pertains to the computing system. The first syntax is received and, in response, the at least one bookmark is inserted into the event log file. The method also includes providing a second syntax for retrieving a user-specified portion of the event log file using the at least one bookmark. The second syntax is received and, in response, the user-specified portion of the event log file is retrieved.

25 Claims, 3 Drawing Sheets

METHODS, SYSTEMS, AND COMPUTER PROGRAM PRODUCTS FOR SELECTIVELY MARKING AND RETRIEVING DATA FROM AN EVENT LOG FILE

TECHNICAL FIELD

The subject matter described herein relates to establishing reference point indicators in event log files to facilitate data retrieval. More particularly, the subject matter described herein relates to methods, systems, and computer program products for selectively marking and retrieving data from an event log file.

BACKGROUND

Presently, event log files may be utilized as a means to keep a record of events (e.g., processes) that occur on or are executed by a given computer system. Various computers utilizing operating systems, such as MICROSOFT WINDOWS®, utilize a plurality of event log files to monitor and maintain the integrity and operation of the computer, such as application event logs, security event logs, and system event logs. Specifically, event log files can be used for recording and monitoring the execution of software applications, recording system audit events, detecting potential security breaches, and the like.

Namely, a computer system typically generates an event log that is essentially a data pool of stored events. Event logs are typically created or added to by applications executed in the computer system so that related data can be retrieved and analyzed at a later occasion. Oftentimes, it is desirable to retrieve event log data that is generated while a system is subjected to tests.

One method for obtaining information from an event log file during a testing procedure entails the retrieval of the event log file in its entirety. However, retrieving an entire event log file can result in the retrieval of data that is not relevant to a particular test, since multiple events may occur before, during, and after a test, that are not relevant to the result of executing the test. As a result, retrieving and reading an entire log file to obtain results of a test is inefficient.

Alternatively, event entries may be retrieved from an event log file by using a command line interface to retrieve the last "X" number of entries, where X is the number of event entries that precedes the most recent entry found in the event log file. While this method enables a user to obtain a portion of the event log file, it still requires examination of irrelevant data to obtain test data of interest. For example, after being retrieved, the event log data may be manually filtered to extract the desired set of events from the non-related events. As a result, even the ability to obtain a portion of a log file does not eliminate the need to manually search through irrelevant information for test results.

Accordingly, a need exists for methods, systems, and computer program products for selectively marking and retrieving data from an event log file.

SUMMARY

According to one aspect, the subject matter described herein comprises methods, systems, and computer program products for selectively marking and retrieving data from an event log file. One method includes providing a first syntax for user insertion of at least one bookmark into an event log file associated with a computing system, wherein the event log file records event data that pertains to the computing system. The first syntax is received and, in response, the at least one bookmark is inserted into the event log file. The method also includes providing a second syntax for retrieving a user-specified portion of the event log file using the at least one bookmark. The second syntax is received and, in response, the user-specified portion of the event log file is retrieved.

The subject matter described herein for selectively marking and retrieving event log data may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
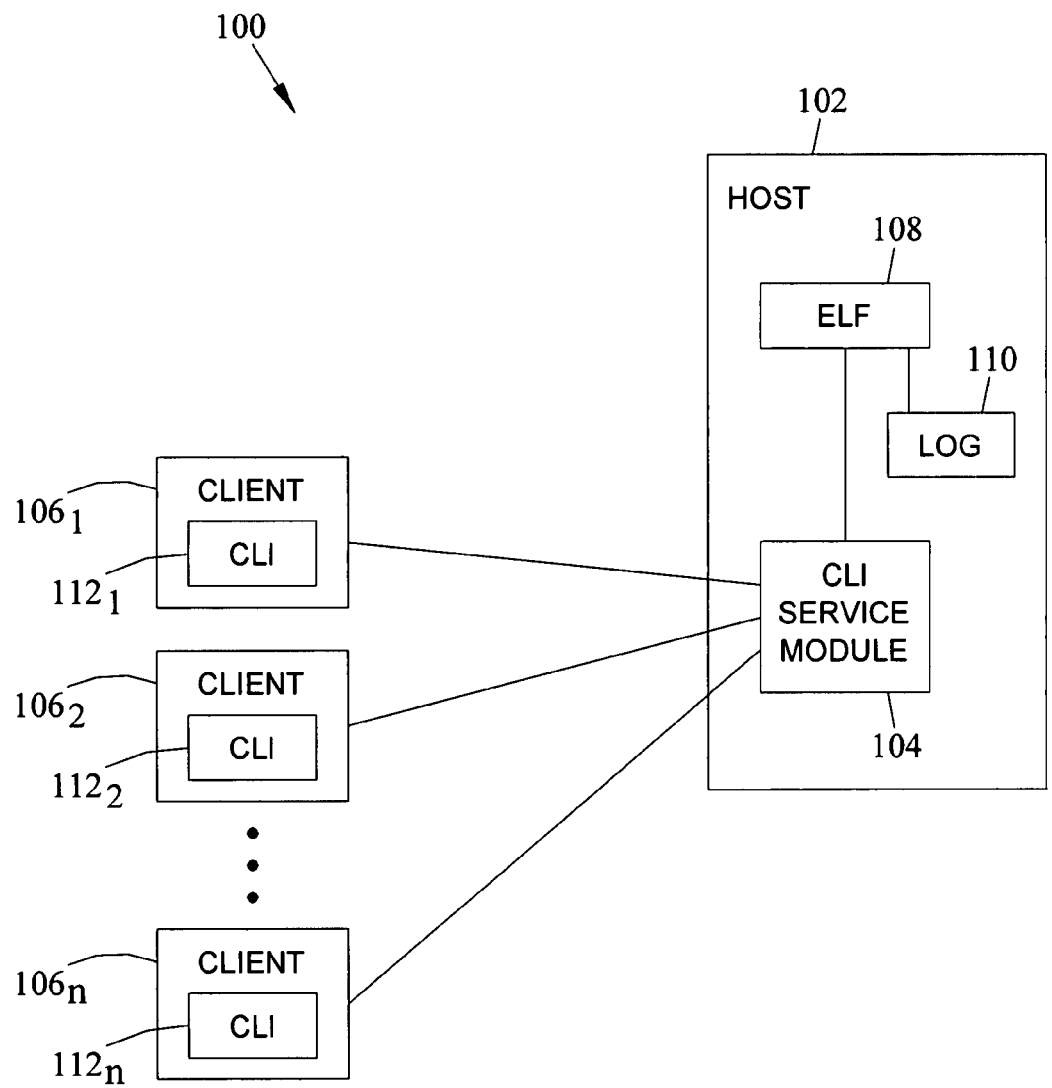
FIG. 1 is a diagram of an exemplary system for selectively marking and retrieving event log data according to an embodiment of the subject matter described herein.

FIG. 1 is a diagram of an exemplary computer system 100 for selectively marking and retrieving data from an event log file according to the subject matter described herein. Referring to FIG. 1, system 100 includes a plurality of clients $106_{1...n}$ and a host unit 102. Each of clients $106_{1...E}$ and host unit 102 may be implemented as a personal computer, a server, or any like computing device. In one embodiment, host unit 102 contains an event log file 110, an event logging function 108, and a command line interface (CLI) service module 104 that is communicatively coupled to the plurality of clients $106_{1...n}$. Each of the clients $106_{1...n}$ is provisioned with a CLI application 112 that may be used to issue CLI commands to host unit 102. Various exemplary CLI commands described herein are Navisphere Management Suite CLI commands for the sake of clarity. The Navisphere Management Suite is a software toolset that enables a user to monitor, configure, manage and test a CLARiiON® data storage system available from EMC Corporation of Hopkinton, Mass. However, those skilled in the art realize that any type of CLI commands may be used without departing from the scope of the present subject matter.

In one embodiment, CLI application 112 forms a connection to host unit 102 via the interface provided by service module 104. For example, CLI application 112 accesses CLI service module 104 via an HTTP or other suitable connection that permits manipulation of event log function 108. In an alternate implementation, a user may access CLI service module 104 of host 102 using a terminal that is locally connected to host 102.

One aspect of the present subject matter pertains to the placement of bookmarks in an event log file generated by a computing system. As used herein, the term "bookmark" refers to a flag or placement indicator that may be inserted into a computer's event log file. The bookmark may be used for the purpose of establishing a reference point in event log file 110. In one embodiment, event logging function 108 can be manipulated by a user for placing bookmarks in the event log file 110. In one embodiment, event log file 110 may include a data file containing event entries that record various actions that have occurred on a host unit 102. Examples of event entries include details of the operations of a software application, detecting a potential security breach, details of a conducted system audit, and the like. For the purpose of this application, an event log file is described generally despite the fact there are various types of event logs, such as a WINDOWS® based application event log, security event log, system event log, and the like.

In order to selectively retrieve data from event log file 110, the present subject matter establishes one or more bookmarks into event log file 110 as mentioned above. In one embodiment of the present subject matter, host system 102 may provide a new CLI command or parameter for inserting bookmarks at user specified locations in event log 110. In one implementation a new command with a new parameter may be provided. For example, in the Navisphere environment, this new command may be called setlog and may include a parameter called bookmark. For example, the syntax format for the setlog command may entail setlog -bookmark <bookmark name>, wherein -bookmark is a field indicator and <bookmark name> is the name of the associated bookmark (i.e., the name following a particular field indicator is the assigned name of the field or in this case, the bookmark itself). Thus, an exemplary CLI command may include naviseccli -h HOST_A setlog -bookmark BMARK_1. The term naviseccli indicates that the following command is a Navisphere CLI command, the -h flag is a field indicator for the name of the host computer (i.e., HOST_A), and the setlog command is used to introduce a bookmark as an information event to event log file 110. In this particular example, the resulting action includes the introduction of the text (i.e., bookmark name) BMARK_1 into the event log file of computer system named HOST_A as an information event.

In an alternate embodiment for introducing a bookmark to event log file 110, a new parameter bookmark may be incorporated into the syntax format of some or all existing CLI commands. That is, "bookmark" may be used as a universal parameter, such that the syntax of each CLI command may include a bookmark adding parameter as one of its arguments. In response to encountering a bookmark parameter as a parameter of a CLI command, event logging function 108 is configured to insert a bookmark into event log file 110 before the execution of the CLI command. Thus, a bookmark may be inserted at a location in event log file 110 wherein the insertion is dependent on a relative time of execution of the CLI command (and therefore the execution times of events affecting the event data initiated by the CLI command). This particular embodiment allows for more efficient testing since the bookmarks used for designating the event log data may be incorporated into the testing commands themselves.

For example, the syntax for a CLI command with an appended bookmark may include naviseccli -h <host> <navi_cmd> <parameters> -bookmark OutlookMainMirror_20040320. The results expected from utilizing this particular command may include the text OutlookMainMirror_20040320 being entered into an event log file of computer system "host" as an information event prior to the execution of the given command (i.e., <navi_cmd> represents any CLI command).

Figure 2:
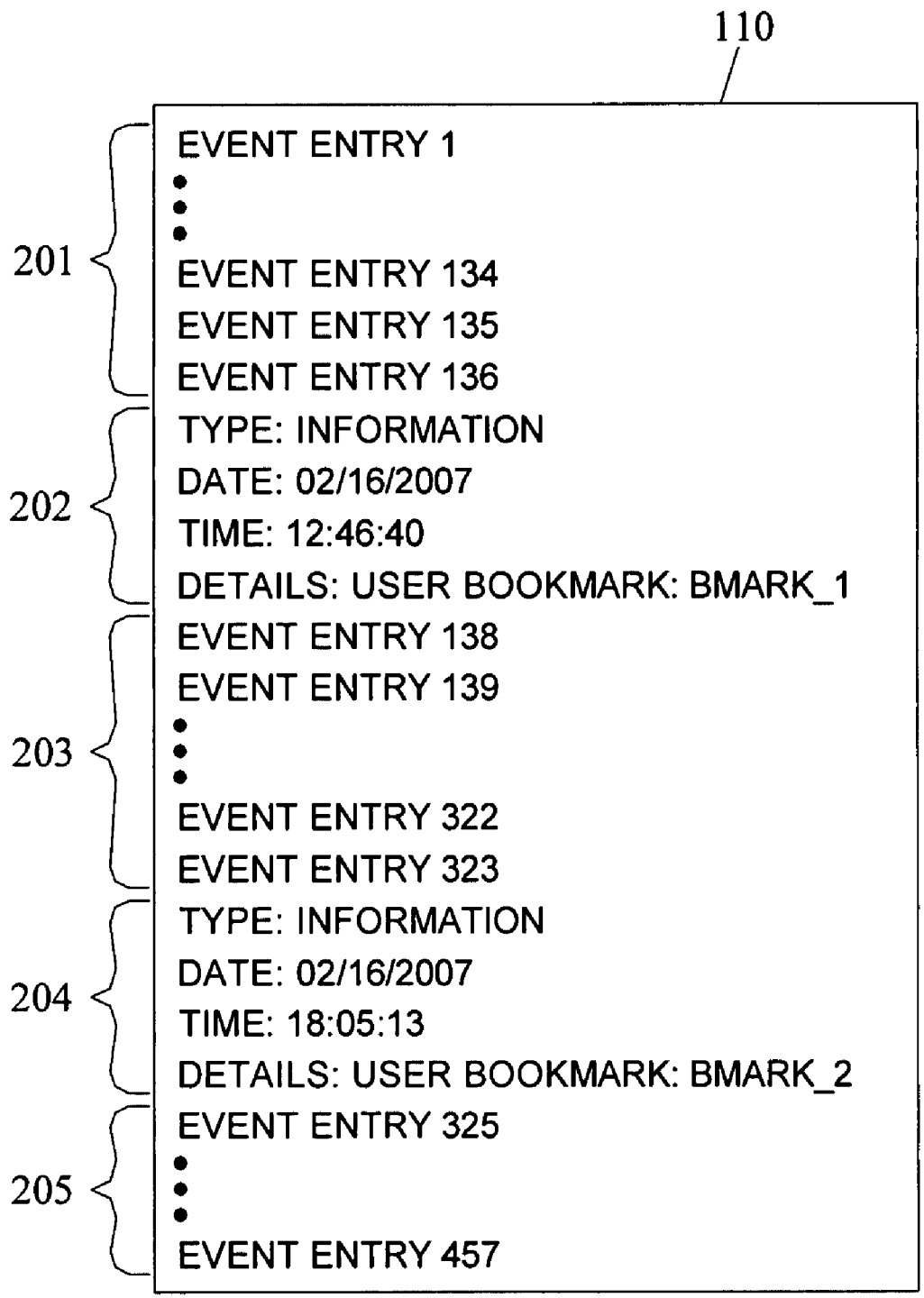
FIG. 2 is a diagram of an exemplary event log file according to an embodiment of the subject matter described herein.

FIG. 2 illustrates event log file 110 including bookmarks embedded using one of the methods described above according to an embodiment of the subject matter described herein. Referring to FIG. 2, event log file 110 is depicted as having recorded a plurality of event log entries (e.g., section 201, which includes event entry 1 through event entry 134) before bookmark 202 is introduced. In this example, bookmark 202 is named BMARK_1 and includes the time and date of its addition to event log file 110. Event log file 110 is shown to have continued to record various events (e.g., section 203, which includes event entry 138 through event entry 323) until a second bookmark 204 is similarly introduced. In this instance, bookmark 204 is named BMARK_2 and includes the time and date of its introduction to event log file 110. Event log file 110 is then depicted as having continued to record a plurality of event entries (e.g., section 205, which includes event entry 325 through event entry 457). Although event log file 110 shows event entry 457 as the last entry, more entries (and bookmarks) may be appended to the end of event log file 110 as additional events are recorded.

After one or more bookmarks have been introduced into event log file 110, the bookmark(s) may be used to retrieve selected portions of event log data. The specific event log portions that are retrieved are based on a predetermined relationship that is defined by the CLI commands issued from client 106. For example, CLI commands may be used to retrieve event log data registered prior to a single bookmark, event log data registered after a single bookmark, event log data registered between two bookmarks, and event log data registered prior to a first bookmark and after a second bookmark (i.e., exclusion of event data registered between the two bookmarks) may be issued from client 106 and executed by host unit 102 (via event logging function 108).

In one embodiment, the retrieval process may be accomplished by utilizing a getlog CLI command that has been modified to include a new set of parameters. For example, an exemplary command with syntax such as naviseccli -h <host> getlog -bm1 <bookmark1> -bm2 <bookmark2> may be used to retrieve data from event log file 110 that exists between recorded <bookmark1> and <bookmark2>. Notably, -bm1 and -bm2 represent field indicators that indicate the specific bookmarks that are used to designate the selected event log data to be retrieved. In one embodiment, the use of this type of CLI command may result in the retrieval of all event entries recorded between (and including) the first information event matching the text of <bookmark1> and the first match of the text specified by <bookmark2>. For example, if the command naviseccli -h HOST_A getlog -bm1 BMARK_1 -bm2 BMARK_2 is issued, then the event entries registered between (and including) BMARK_1 and BMARK_2 in the event log file of computer HOST_A are obtained. Referring to FIG. 2, event entry section 203 would be retrieved using this command (along with bookmark/event entry 202 and bookmark/event entry 204). Namely, section 201 and section 205 would not be retrieved in this particular example. By excluding portions of the event log file from being retrieved, analysis of a desired section by the requesting entity may be conducted in a more efficient manner. In a related embodiment, a section of event log file may be excluded by modifying the CLI command. For example, if section 203 was to be excluded and sections 201 and 205 were to be retrieved, then a command such as naviseccli -h HOST_A getlog -bm1 BMARK_1 -bm2 BMARK_2 -exclude may be issued. Notably, the command is nearly identical to the command mentioned above except for the addition of an "-exclude" parameter appended to the end of the command.

In a second exemplary embodiment, the CLI command naviseccli -h HOST_A getlog -bm1 BMARK_1 -after may be used to retrieve all event log entries existing between (and including) the first information event that matches the text specified by BMARK_1 and the last event found in event log file 110. Alternatively, CLI command naviseccli -h HOST_A getlog -bm1 BMARK_1 may be used as a default command to obtain information following a bookmark (i.e., no need to use the "-after" portion of the command). For instance, if the command naviseccli -h HOST_A getlog bm1 BMARK_1 is issued, then all event logs on computer HOST_A that exist between the inserted BMARK_1 and the last event found in event log file 200 is obtained. Referring to FIG. 2, event entry section 203 and event entry section 205 would be retrieved in this example. Furthermore, the information event entry 202 (i.e., BMARK_1) and the information event entry 204 (i.e., BMARK_2) would also be retrieved.

In a third exemplary embodiment, the CLI command naviseccli -h host getlog -bm1 <bookmark1> -before may be used to retrieve all event logs existing between (and including) the first information event that matches the text specified by <bookmark1> and the first event recorded in event log file 200. For instance, if the command naviseccli -h HOST_A getlog -bm1 BMARK_1 -before is issued, then all event log entries on computer HOST_A that exist between (and including) the inserted BMARK_1 and the first event found in event log file 200 is obtained. Referring to FIG. 2, event entry section 201 would be retrieved in this scenario. Furthermore, the information event entry 202 (i.e., BMARK_1) would also be retrieved. Although, the retrieval of data with relation to the first bookmark, the CLI command may easily be modified so that data preceding or following a second (or subsequent) bookmark may be retrieved. For example, this may be done by modifying the indicator flag and/or the name of the bookmark in the CLI command (i.e., using -bm2 BMARK_2).

Figure 3:
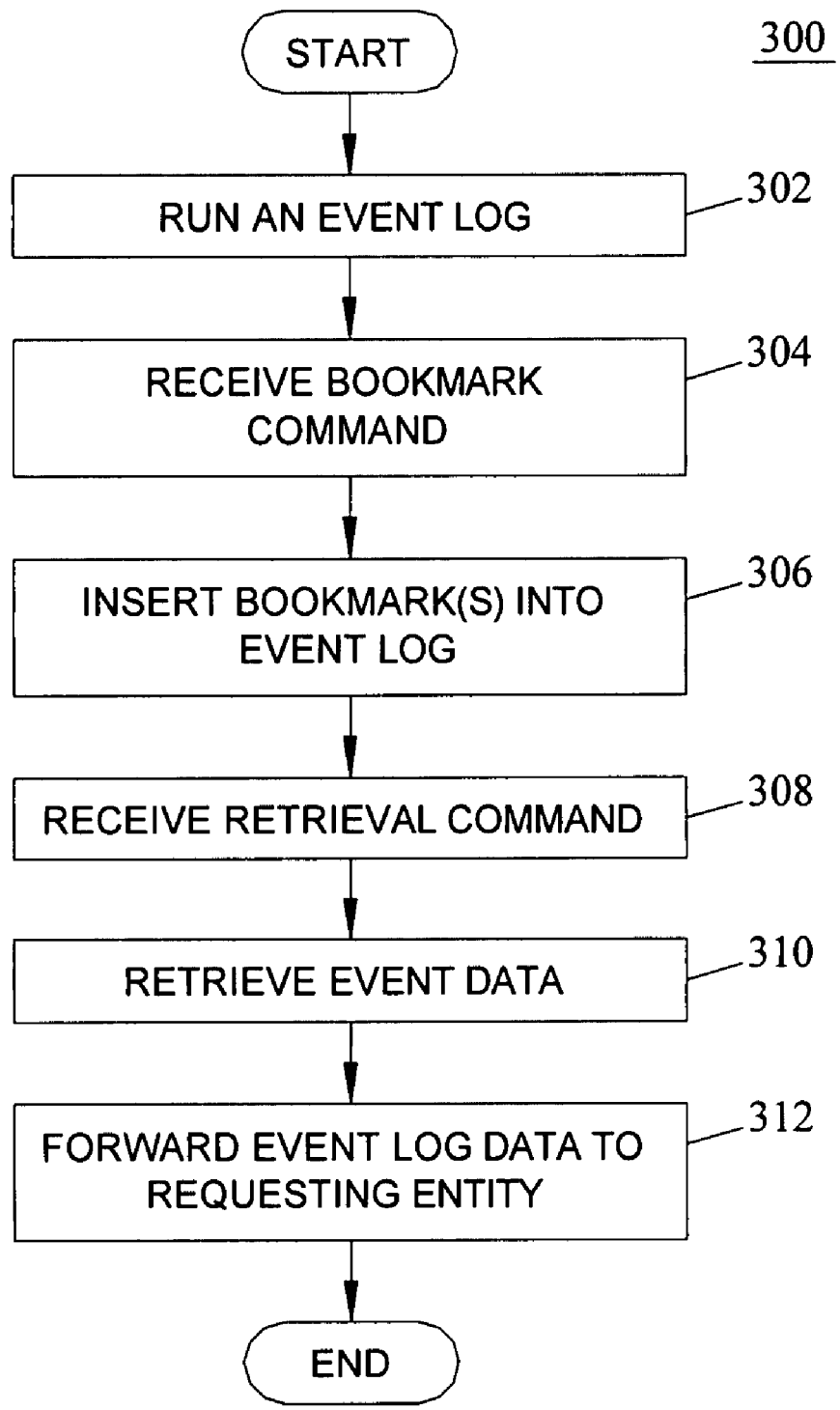
FIG. 3 is a flow chart of a process for selectively marking and retrieving event log data according to an embodiment of the subject matter described herein.

FIG. 3 is a flow chart illustrating an exemplary process for utilizing one or more event log bookmarks according to an embodiment of the subject matter described herein. Referring to FIG. 3, in block 302, an event log file is generated. In one embodiment, host unit 102 may be running various applications that generate entries that are normally recorded by event logging function 108. These entries are typically recorded as events in event log file 110. As software applications are executed on host unit 102, event log file 110 continues to expand as it receives event log entries issued from event logging function 108.

In block 304, a command to establish a bookmark is received. In one embodiment, host unit 102 receives a CLI command requesting the placement of a bookmark issued from client computer 106. Specifically, CLI service module 104 in host unit 102 may receive a CLI command (e.g., a "first syntax") requesting the placement of a bookmark in event log file 110 and forwards the bookmark request to event logging function 108 for further processing.

In block 306, at least one bookmark is inserted into the event log file. In one embodiment, event logging function 108 adds a bookmark by inserting an information event into event log file 110 in response to receiving the CLI command from CLI service module 104. For example, CLI service module 104 provides a first syntax (i.e., a CLI bookmark command of a particular format) to event logging function 108 in order to insert one or more bookmarks into event log file 110. Upon receiving the first syntax, event logging function 108 inserts the bookmark(s) into event log file 110. In one embodiment, this may be accomplished using the setlog command that includes a bookmark parameter.

In block 308, a retrieval command is received. In one embodiment, host unit 102 receives a CLI retrieval command (e.g., a "second syntax") requesting the retrieval of a designated section of event data log file 110. For example, CLI service module 104 may receive a getlog CLI command from client 106.

In block 310, event log data is retrieved. In one embodiment, a retrieval CLI command specifying at least one bookmark is forwarded to event logging function 108 from CLI service module 104. For example, CLI service module 104 provides a second syntax (e.g., a CLI retrieval command) to event logging function 108 for the retrieval of a user-specified portion of the event log file using the previously inserted bookmark(s). Event logging function 108 retrieves the user-specified portion of event log file 110 upon receiving the second syntax.

In one embodiment, the sections of event log file 110 to be retrieved are dependent on the predefined relationship between the retrieval command used and the bookmarks specified by the CLI command. For example, if a single bookmark is referenced in the retrieval command, the predefined relationship may include the designation of event log data recorded prior to, or after, the established bookmark. Similarly, if a pair of bookmarks is referenced in the retrieval command, the predefined relationship may include the designation of event log data recorded between the first and second bookmark, or alternatively, the designation of event log data recorded prior to the first bookmark and event data recorded after the second bookmark.

In block 312, the retrieved event log data is forwarded to the requesting entity. In one embodiment, the retrieved event log data may be forwarded by CLI service module 104 to the requesting client computer. For example, requesting client computer 106 may receive the specified section of event log data from CLI service module 104. The data may then be subsequently analyzed for testing purposes or the like. Because client computer 106 did not require the entire event log file 110, the analysis of the event log data may be conducted in a more efficient manner.

It will be understood that various details of the invention may be changed without departing from the scope of the invention. Furthermore, the foregoing description is for the purpose of illustration only, and not for the purpose of limitation.

What is claimed is:

1. A method for selectively marking and retrieving data from an event log file, the method comprising:
providing first syntax for user insertion of at least one bookmark into an event log file associated with a computing system, wherein the event log file records event data pertaining to the computing system, and wherein the event log data in the event log file includes records of executed software applications, records of system audit events, and records of potential security breaches, wherein providing the first syntax includes providing a command that allows a user to introduce a bookmark in the event log file as an information event;
in response to receiving the first syntax, inserting the at least one bookmark into the event log file;
providing second syntax for retrieving a user-specified portion of the event log file using the at least one bookmark, wherein the second syntax allows the user to retrieve event log data from the event log file having a user-specified relative location with respect to a location of the at least one bookmark in the event log file, wherein the second syntax includes a command that allows the user to retrieve the records of executed software events, the records of system audit events, and the records of security breaches that appear in the event log file before or after the information event; and in response to receiving the second syntax, retrieving the user-specified portion of the event log file.

2. The method of claim 1 wherein providing the first syntax includes providing a command line interface (CLI) command for inserting the at least one bookmark.

3. The method of claim 2 wherein inserting the at least one bookmark into the event log file includes inserting the at least one bookmark at a location in the event log file dependent on a relative time of execution of the CLI command and execution times of events affecting the event data.

4. The method of claim 1 wherein providing the first syntax includes providing a parameter to existing command line interface (CLI) commands for inserting the at least one bookmark in the event log file.

5. The method of claim 4 wherein inserting the at least one bookmark into the event log file includes inserting the at least one bookmark into the event log file prior to execution of a CLI command that includes the parameter so that the at least one bookmark appears at a location in the event log file before results of the execution of the CLI command.

6. The method of claim 1 wherein providing the second syntax includes providing a command line interface (CLI) command for retrieving the user-specified portion of the event log file.

7. The method of claim 1 wherein the at least one bookmark comprises a single bookmark and wherein the user specified portion of the event log file comprises event log data generated prior to the single bookmark.

8. The method of claim 1 wherein the at least one bookmark comprises a single bookmark and wherein the user specified portion of the event log file comprises event log data generated after the single bookmark.

9. The method of claim 1 wherein the at least one bookmark comprises a first bookmark and a second bookmark.

10. The method of claim 9 wherein the user specified portion of the event log file comprises event log data generated after the first bookmark and before the second bookmark.

11. The method of claim 9 wherein the user specified portion of the event log file comprises event log data generated before the first bookmark and after the second bookmark.

12. The method of claim 1 wherein the computing system comprises a disk storage system and wherein the event log file stores events relating to activities performed in the disk storage system.

13. A system for selectively marking and retrieving data from an event log file, the system comprising:
a host computing device that includes:
a service module for providing first syntax for user insertion of at least one bookmark into an event log file associated with a computing system wherein the event log file records event data pertaining to the computing system, and wherein the event log data in the event log file includes records of executed software applications, records of system audit events, and records of potential security breaches, wherein providing the first syntax includes providing a command that allows a user to introduce a bookmark as an information event in the event log file, and for providing second syntax for retrieving a user-specified portion of the event log file using the at least one bookmark, wherein the second syntax allows the user to retrieve event log data from the event log file having a user-specified relative location with respect to a location of the at least one bookmark in the event log file, wherein the second syntax includes a command that allows the user to retrieve the records of executed software events, the records of system audit events, and the records of security breaches that appear in the event log file before or after the information event; and
an event logging module for inserting the at least one bookmark at a location into the event log file in response to receiving the first syntax from the service module, and for retrieving the user-specified portion of the event log file in response to receiving the second syntax from the service module.

14. The system of claim 13 wherein the service module comprises a command line interface (CLI) service module adapted to provide the first syntax using a CLI command.

15. The system of claim 14 wherein the event logging module is adapted to insert the at least one bookmark into the event log file by inserting the at least one bookmark at a location in the event log file dependent on a relative time of execution of the CLI command and execution times of events affecting the event data.

16. The system of claim 13 wherein the CLI service module is adapted to provide the first syntax using a parameter to existing CLI commands for inserting the at least one bookmark into the event log file.

17. The system of claim 16 wherein the event logging function is adapted to insert the at least one bookmark into the event log file by inserting the at least one bookmark into the event log file prior to execution of a CLI command that includes the parameter so that the at least one bookmark will appear at a location in the event log file before results of the execution of the CLI command.

18. The system of claim 13 wherein the service module comprises a command line interface (CLI) service module adapted to provide the second syntax using a CLI command.

19. The system of claim 13 wherein the at least one bookmark comprises a single bookmark and wherein the user specified portion of the event log file comprises event log data generated prior to the single bookmark.

20. The system of claim 13 wherein the at least one bookmark comprises a single bookmark and wherein the user specified portion of the event log file comprises event log data generated after the single bookmark.

21. The system of claim 13 wherein the at least one bookmark comprises a first bookmark and a second bookmark.

22. The system of claim 21 wherein the user specified portion of the event log file comprises event entries generated after the first bookmark and before the second bookmark.

23. The system of claim 21 wherein the user specified portion of the event log file comprises event entries generated before the first bookmark and after the second bookmark.

24. The system of claim 13 wherein the computing system comprises a disk storage system and wherein the event log file stores events relating to activities performed in the disk storage system.

25. A computer program product comprising computer-executable instructions embodied in a computer-readable medium for performing steps comprising:
providing first syntax for user insertion of at least one bookmark into an event log file associated with a computing system, wherein the event log file records event data pertaining to the computing system, and wherein the event log data in the event log file includes records of executed software applications, records of system audit events, and records of potential security breaches, wherein providing the first syntax includes providing a command that allows a user to introduce a bookmark as an information event in the event log file;
in response to receiving the first syntax, inserting the at least one bookmark into the event log file;

providing second syntax for retrieving a user-specified portion of the event log file using the at least one bookmark; and in response to receiving the second syntax, retrieving the user-specified portion of the event log file, wherein the second syntax allows the user to retrieve event log data from the event log file having a user-specified relative location with respect to a location of the at least one bookmark in the event log file, wherein the second syntax includes a command that allows the user to retrieve the records of executed software events, the records of system audit events, and the records of security breaches that appear in the event log file before or after the information event.

* * * * *